Feb. 24, 1959  S. L. CHRISTIE ET AL  2,875,396
BATTERY CHARGING SYSTEM
Filed Oct. 25, 1954
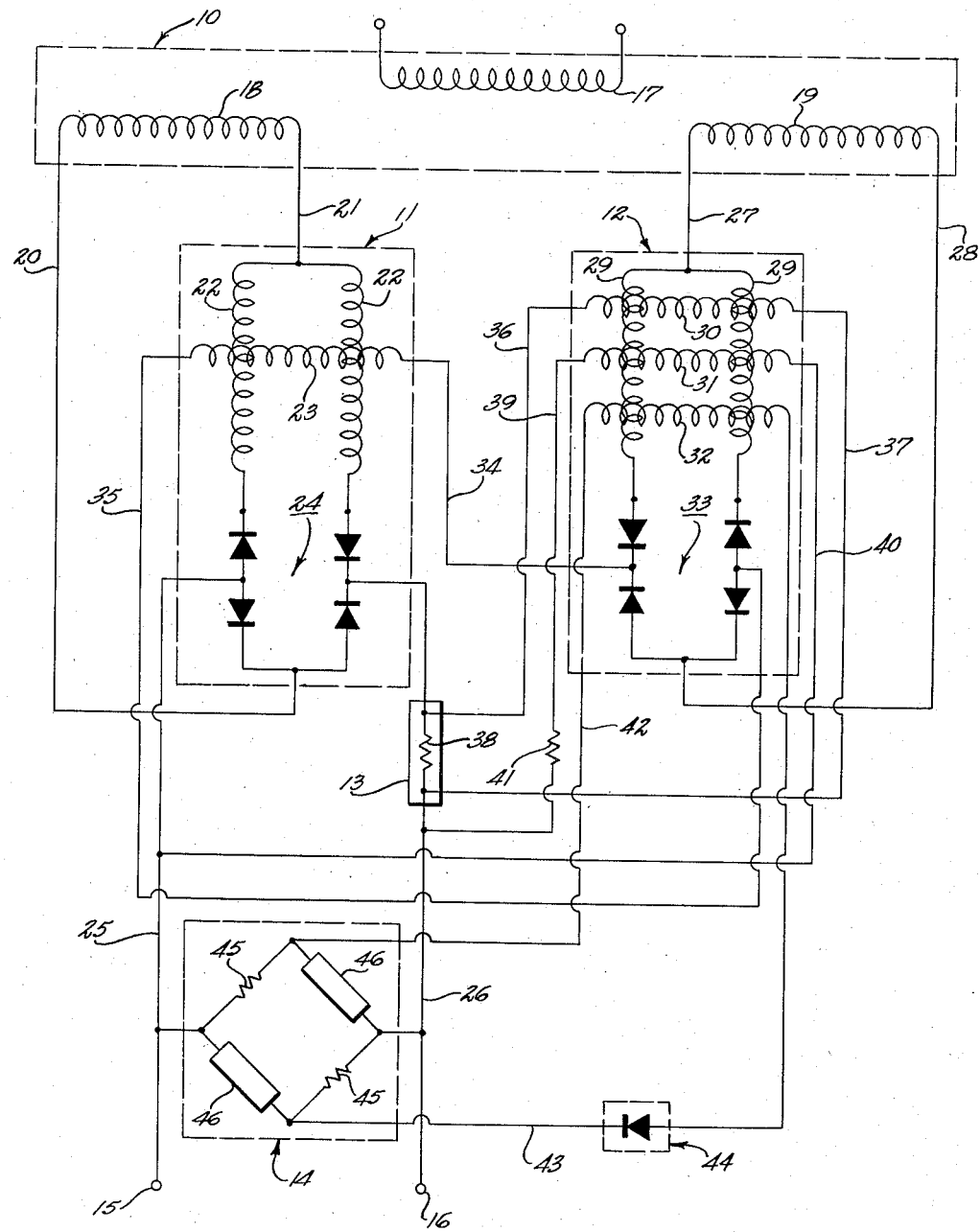
INVENTORS.
SOREN L. CHRISTIE
FRANK C. MARSHALL
BY THEIR ATTORNEYS.
HARRIS, KIECH, FOSTER & HARRIS

# United States Patent Office 2,875,396
Patented Feb. 24, 1959

2,875,396

BATTERY CHARGING SYSTEM

Soren L. Christie and Frank C. Marshall, Los Angeles, Calif., assignors to Christie Electric Corp., a corporation of California Application October 25, 1954, Serial No. 464,205

8 Claims. (Cl. 321—19)

This invention relates to a method of and apparatus for producing and controlling a direct current output from an alternating current source and, in particular, to a system for charging an electric storage battery.

It is an object of the invention to provide a dependable and fool-proof charging system with a high utilization factor of the equipment and one which delivers the correct amount of charge under various conditions of temperature, supply voltage fluctuation, battery condition and capacity.

Another object of the invention is to provide a battery charging system in which the charging rate is controlled by the rated current maximum during a first period and by the battery voltage during a second period.

A further object of the invention is to provide a method of charging a battery whereby a voltage control overrides the current control when the battery voltage reaches a predetermined value, providing a constant end voltage irrespective of fluctuations in supply line voltage.

Still a further object of the invention is to provide a means whereby the predetermined value of voltage and the end voltage are increased when the temperature decreases and are decreased when the temperature increases.

Another object of the invention is to provide a higher charging voltage for batteries with sulphated plates.

A further object of the invention is to provide a battery charging system wherein a portion of the control is derived from a charging current sensing means, a portion from a charging voltage sensing means, and a portion from a temperature sensing means.

Another object of the invention is to provide in a battery charging system a first magnetic amplifier for controlling the charging rate and a second magnetic amplifier for controlling the first amplifier.

A still further object of the invention is to provide a non-linear, voltage sensing means of high sensitivity.

It is a further object of the invention to accomplish the above stated objects without the use of relays, electronic tubes or moving parts.

The invention also comprises novel details of construction and novel combinations and arrangements of parts, which will more fully appear in the course of the following description. However, the drawing merely shows and the description merely describes a preferred embodiment of the present invention as applied to a battery charging system, which is given by way of illustration or example only.

The drawing is a schematic showing the circuit connection of a battery charging system embodying the invention.

Referring to the drawing, a preferred arrangement of apparatus for producing and controlling a direct current output is illustrated, comprising a transformer 10, a power unit 11, a control unit 12, a current sensing means 13, a combined voltage and temperature sensing means 14, and output terminals 15, 16 to which a battery may be connected for purposes of charging.

The transformer 10 is shown having a primary winding 17 connectible to an alternating current power source, and two secondary windings 18, 19. The secondary winding 18 is connected to the power unit 11 by two conductors 20, 21. The power unit 11 is a means for converting an alternating current voltage to a direct current voltage in accordance with an external control signal, and may consist of a saturable reactor having a power winding 22 and a control winding 23, and a full wave rectifier 24. The direct current output of the power unit is connected to the terminals 15, 16 by two conductors 25, 26.

The secondary winding 19 is connected to the control unit 12 by two conductors 27, 28. The control unit 12 is a means for combining the outputs of several sensing means to provide the required external control signal for the power unit 11, and may consist of a saturable reactor having a power winding 29 and three control windings 30, 31, 32, and a full wave rectifier 33. The output of the control unit is connected to the power unit by conductors 34, 35.

The current sensing means 13 is connected in conductor 26 intermediate the power unit 11 and the terminal 16. The output of the current sensing means is connected to the control winding 30 by conductors 36, 37. The current sensing means may consist of a resistor 38 serially connected in the conductor 26 so that a major portion of the charging current will flow through the resistor 38 and a small portion will flow through the control winding 30.

The control winding 31 is shunt connected across the power unit output conductors 25, 26 by conductors 39, 40. A resistor 41 is serially connected in the conductor 39 intermediate the control winding 31 and the output conductor 26.

The voltage and temperature sensing means 14 is also shunt connected across the power unit output conductors 25, 26, and its output is connected to the control winding 32 by conductors 42, 43. Rectifier means 44 is serially connected in the conductor 43 intermediate the control winding 32 and the voltage and temperature sensing means 14, whereby current of only one polarity is permitted to flow in the control winding 32.

The voltage and temperature sensing means 14 may be a four element bridge network and is shown as consisting of two linear resistance elements 45 and two non-linear resistance elements 46. The resistance of each of the non-linear elements 46 varies with the current through the element and also with its temperature. Only one such element is necessary for proper functioning of the bridge circuit; however, greater sensitivity is achieved by the use of two non-linear elements. If even greater sensitivity is desired, non-linear elements which vary with the current and temperature in a manner inverse to the non-linear elements 46 may be substituted for the linear elements 45. Also, if desired, one or more elements of the bridge circuit may be selected to be sensitive to current changes only and other elements of the bridge circuit may be sensitive to temperature changes only. The temperature sensitive elements are positioned so that they will respond to temperature variations in the charging apparatus as well as in the surrounding air.

The resistance values of the elements 45, 46 are selected so that with a particular voltage between the output terminals 15, 16 and at a particular temperature of the elements, the output signal of the bridge circuit is zero. These particular values are usually referred to as the cutback voltage and the normally operating temperature. The elements of the bridge are so selected that an increase in the output voltage above the cutback voltage and an increase in the operating temperature above the normal produce bridge circuit output signals of the same polarity.

The operation of the invention in charging a battery is described below. The battery to be charged is connected to the terminals 15, 16 and a suitable power source is connected to the primary winding 17 of the transformer 10. The alternating current power supplied by the secondary winding 18 passes through the power winding 22 of the power unit saturable reactor, and is converted to direct current power by the full wave rectifier 24, and this direct current power is fed to the battery through the conductors 25, 26. The amount of current that passes through the power unit saturable reactor power winding 22 is controlled by the current in the control winding 23.

Similarly, the alternating current power supplied by the secondary winding 19 passes through the power winding 29 of the control unit saturable reactor, and is converted to direct current power by the full wave rectifier 33, and this direct current power is fed to the power unit control winding 23 through the conductors 34, 35. In a like manner, the amount of current that passes through the control unit saturable reactor power winding 29 and also, therefore, the amount of current in the power unit control winding 23, is controlled by the currents in the control windings 30, 31, 32. The function of these windings will be explained below.

Whereas a high initial charging rate would be possible for a short period at the beginning of the charging cycle, it is not economical to construct a power unit capable of producing this charging rate. In the invention, a power unit of capacity less than this possible rate is provided and in the first portion of the charging cycle the charging rate is limited to the capacity of the power unit. This is accomplished by use of the current sensing means 13 and the power unit control winding 23. The currents through the control windings 30 and 31 of the control unit are adjusted so that when the charging current through the conductors 25, 26 tends to exceed the current rating of the power unit, the output current of the control unit which flows through the power unit control winding 23 will cause a reduction in the output of the power unit to limit it to the desired maximum value. The control winding 31 provides the necessary bias for the operation of the saturable reactor. The magnitude of the bias current is adjusted by selection of the value of the resistor 41. The control winding 30 varies the control unit output in response to signals from the current sensing means 13. When the charging current tends to fall below the current rating of the power unit, the output current of the control unit is changed in the opposite sense to increase the output of the power unit (except as discussed below). Hence, it is seen that the charging rate is maintained at an optimum value independent of variations in the power source.

This mode of operation continues until the battery voltage reaches the previously mentioned critical value.

When the battery voltage is less than the critical voltage, as normally is the case in the first portion of the charging cycle, the output of the voltage and temperature sensing means 14 is of a polarity which, if introduced into the control winding 32, would produce an increase in the charging current. However, the rectifier means 44 is connected in the conductor 43 so as to block the flow of current of this polarity in the control winding 32. But when the battery voltage rises above the critical voltage, the polarity of the output of the sensing means 14 reverses, causing a reduction in charging current. This reduction in charging current is sensed by the current sensing means 13 which would tend to cause an increase in charging current. But the sensitivities of the two sensing means and their associated control windings are such that the voltage and temperature sensing means now overrides the current sensing means. Hence, the charging current is reduced as the voltage goes above the critical voltage and the charging voltage assumes a fixed value independent of variations in the power source.

In the above description it has been assumed that the operating temperature has been at the normal previously referred to. The fully charged terminal voltage of a battery is inversely relative to the temperature of the battery. Therefore, if the temperature of a battery being charged is above the normal operating temperature, the fully charged voltage and the cutback voltage should be lowered, and, conversely, they should be increased if the battery temperature is below the normal. The operating temperatures of the battery and of the charging apparatus are both affected by the temperature of the surrounding air and by the heat generated in the battery and in the charging apparatus.

When the temperature is above the normal, the effect of the temperature sensitive elements is to produce a bridge circuit output of a value which will reduce the voltage at which the control winding 32 begins to override the control winding 30. A decrease in the temperature below the normal produces a bridge circuit output which has the effect of increasing the cutback voltage.

By reason of the fact that the charging rate has been made a function of the heat produced by the charging apparatus, the invention also provides an optimum charging rate for batteries, the plates of which have become badly sulphated. The internal resistance of a battery with heavily sulphated plates is higher than that of a normal battery. With such a battery the charging current may be lower than for a normal battery. In charging a badly sulphated battery, the power unit will produce less heat since a lower output current is being delivered. This will result in an operating temperature less than normal and a concomitant raising of the cutback voltage, which will delay the point at which the control due to the voltage and sensing means 14 begins to override the control due to the current sensing means 13.

From the foregoing it will be seen that a method of and apparatus for charging a battery have been provided which permit operation at an optimum rate, taking into consideration the capacity of the equipment, the condition of the battery, the state of charge of the battery, the temperature of the surroundings and variations in the power source.

While a preferred embodiment of the invention is shown and described, it is, of course, subject to modifications without departing from the spirit and scope of the invention. It is, therefore, not desired to restrict the invention to the particular forms illustrated and described, but to cover all modifications that may fall within the scope of the patent claims.

We claim as our invention:

1. In a battery charging system, the combination of: an electric power unit having an alternating current input, a direct current output and electromagnetic means adapted to control said direct current output; a control unit comprising saturable reactor means having a power winding, a first control winding and a second control winding, said power winding being operatively connected with said electromagnetic means; current sensing means providing a first signal responsive to the current in said direct current output, and connected to said first control winding; and voltage sensing means providing a second signal responsive to the deviation above a predetermined value of the voltage across said direct current output, and connected to said second control winding.

2. In a battery charging system, the combination of: a first saturable reactor means having a first input, a first output and a first control winding; a second saturable reactor means having a second input, a second output and a second and a third control winding; a power source coupled to said first input and to said second input; circuit means operatively connecting said second output to said first control winding; a resistor serially connected in one line of said first output; circuit means interconnecting the terminals of said resistor and said second control winding; a bridge circuit having its input connected across said first output and its output connected to said third control winding and having an element whose resistance varies both with the voltage applied across it and with its temperature; and rectifier means connected intermediate said bridge circuit output and said third control winding whereby current of only one polarity flows between said interconnected components.

3. In a battery charging system, the combination of: an electric power unit having an alternating current input, a direct current output and electromagnetic means adapted to control said direct current output; a control unit comprising saturable reactor means having a power winding, a first control winding and a second control winding, said power winding being operatively connected with said electromagnetic means; current sensing means providing a first signal responsive to the current in said direct current output, and connected to said first control winding; and voltage sensing means providing a second signal responsive to the deviation from a predetermined value of the voltage across said direct current output, and connected to said second control winding, said voltage sensing means including a bridge circuit connected across said direct current output and having at least one element whose resistance varies substantially with the voltage applied across it.

4. In a battery charging system, the combination of: an electric power unit having an alternating current input, a direct current output and electromagnetic means adapted to control said direct current output; a control unit comprising saturable reactor means having a power winding, a first control winding and a second control winding, said power winding being operatively connected with said electromagnetic means; current sensing means providing a first signal responsive to the current in said direct current output, and connected to said first control winding; voltage sensing means providing a second signal responsive to the deviation from a predetermined value of the voltage across said direct current output, and connected to said second control winding; and polarity sensitive means connected intermediate said voltage sensing means and said second control winding whereby signals of only one polarity are transmitted to said second control winding.

5. In a battery charging system, the combination of: an electric power unit having an alternating current input, a direct current output and electromagnetic means adapted to control said direct current output, said electromagnetic means comprising first saturable reactor means having a first power winding and a first control winding; a control unit comprising second saturable reactor means having a second power winding, a second control winding and a third control winding, said second power winding being operatively connected with said first control winding; current sensing means providing a first signal responsive to the current in said direct current output, and connected to said second control winding; and voltage sensing means providing a second signal responsive to the deviation from a predetermined value of the voltage across said direct current output, and connected to said third control winding, said voltage sensing means having no output when said voltage across said direct current output is said predetermined value.

6. In a battery charging system, the combination of: an electric power unit having alternating current input, a direct current output and electromagnetic means adapted to control said direct current output; a control unit comprising saturable reactor means having a power circuit and a control circuit, said power circuit being operatively connected with said electromagnetic means; current sensing means providing a first signal responsive to the current in said direct current output, and connected to said control circuit; and voltage sensing means providing a second signal responsive to the deviation above a predetermined value of the voltage across the direct current output, and connected to said control circuit, said second signal being of a magnitude to override said first signal.

7. In a battery charging system, the combination of: an electric power unit having an alternating current input, a direct current output and electromagnetic means adapted to control said direct current output; a control unit comprising saturable reactor means having a power winding, a first control winding and a second control winding, said power winding being operatively connected with said electromagnetic means; current sensing means providing a first signal responsive to the current in said direct current output, and connected to said first control winding; and voltage sensing means providing a second signal responsive to the deviation from a predetermined value of the voltage across said direct current output, and connected to said second control winding, said voltage sensing means including a bridge circuit connected across said direct current output and having at least one element whose resistance varies substantially with the voltage applied across it, said bridge circuit containing at least one temperature sensing means.

8. A battery charging system as defined in claim 7 in which said temperature sensing means is positioned to be influenced by the ambient temperature and the heat generated by said battery charger.

References Cited in the file of this patent

UNITED STATES PATENTS

| | | |
|---|---|---|
| 2,179,299 | Murcek | Nov. 7, 1939 |
| 2,272,745 | Hinds et al. | Feb. 10, 1942 |
| 2,306,998 | Claesson | Dec. 29, 1942 |
| 2,421,523 | Rady | June 3, 1947 |
| 2,431,311 | Cronvall | Nov. 25, 1947 |
| 2,502,692 | Albrand | Apr. 4, 1950 |
| 2,660,702 | Arvidsson | Nov. 25, 1953 |
| 2,707,262 | Walker et al. | Apr. 26, 1955 |
| 2,717,351 | Christian et al. | Sept. 6, 1955 |
| 2,719,257 | Sargeant et al. | Sept. 27, 1955 |
| 2,721,304 | Silver et al. | Oct. 18, 1955 |
| 2,723,372 | Eagan et al. | Nov. 8, 1955 |